(12) United States Patent
Lühmann et al.

(10) Patent No.: US 6,544,639 B1
(45) Date of Patent: Apr. 8, 2003

(54) ADHESIVE TAPE STRIP

(75) Inventors: Bernd Lühmann, Norderstedt (DE); Thorsten Krawinkel, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/391,995

(22) Filed: Sep. 9, 1999

(30) Foreign Application Priority Data

Sep. 19, 1998 (DE) .......................................... 198 42 865

(51) Int. Cl.[7] .............................. B32B 7/12; B32B 23/02
(52) U.S. Cl. ...................... 428/343; 428/343; 428/347; 428/192; 428/200; 428/202
(58) Field of Search ................................ 428/343, 347, 428/192, 200, 202

(56) References Cited

U.S. PATENT DOCUMENTS 5,626,931 A * 5/1997 Luhmann .................... 428/40.1
5,725,923 A * 3/1998 Luhmann .................... 428/40.1

FOREIGN PATENT DOCUMENTS

| DE | 44 28 587 A1 | 2/1996 |
|---|---|---|
| EP | 0 845 515 A2 | 6/1998 |

* cited by examiner

*Primary Examiner*—Terrel Morris
*Assistant Examiner*—Alexis Wachtel
(74) *Attorney, Agent, or Firm*—Norris McLaughlin & Marcus

(57) ABSTRACT

Adhesive tape strip for a rereleasable adhesive bond, which can be removed from a bonded joint by pulling in the direction of the bond plane, characterized in that the bonding area decreases in the region of the grip tab or in the pressure-sensitive adhesive region directly bordering the grip tab.

18 Claims, 2 Drawing Sheets

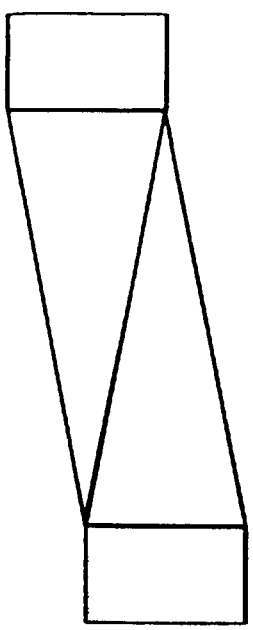
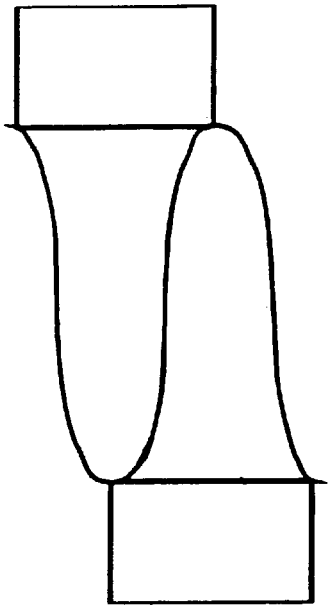
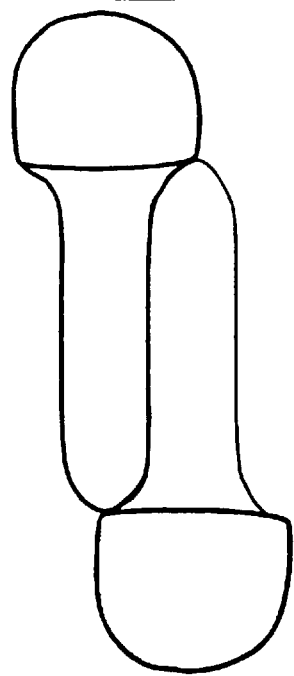
Fig. 9     Fig. 10     Fig. 11
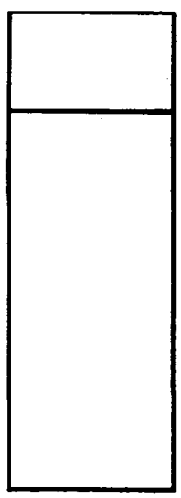
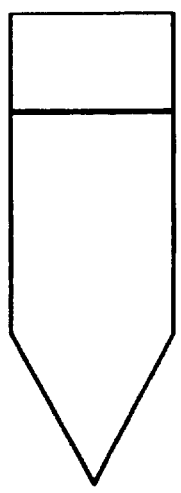
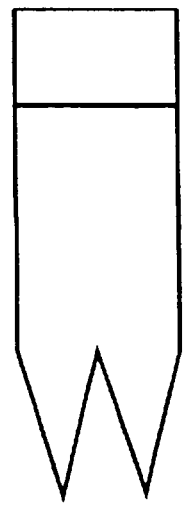
Fig. 12     Fig. 13     Fig. 14

ADHESIVE TAPE STRIP

The invention relates to an adhesive tape strip for a rereleasable adhesive bond which can be removed from a bonded joint by pulling in the direction of the bond plane.

Elastically or plastically highly extensible self-adhesive tapes which can be redetached nondestructively and without residue by stretching essentially in the bond plane (by what is known as stripping), even from in some cases highly sensitive bonding substrates, such as papers or coated woodchip wallpaper, for example, are described in U.S. Pat. No. 4,024,312, DE 33 31 016, WO 92/11332, WO 92/11333, DE 42 22 849, WO 95/06691, DE 195 31 696, DE 196 26 870, DE 196 49 727, DE 196 49 728, DE 196 49 729 and DE 197 08 366. They are frequently employed in the form of adhesive tape strips having a preferably nonadhesive grip-tab region from which the detachment process is initiated. Particular applications and embodiments of such self-adhesive tapes can be found, inter alia, in DE 42 33 872, WO 94/21157, DE 44 28 587, DE 44 31 914, WO 97/07172, DE 196 49 636 and WO 98/03601.

Instances of tearing of such strippable self-adhesive tapes are a problem, especially in the region of the preferably nonadhesive grip tab and/or in the adhesive region directly bordering the preferably nonadhesive grip-tab region, and also in the main region of the bond, including the region between grip tab, or adhesive region close to the grip tab, and the end region of the adhesive strips. DE 44 31 914 describes a very specific measure for reducing the tendency to tear in the grip-tab region: surprisingly, it is found here that a significant reduction in the tendency to tear in the grip-tab region is obtained by using a cover in the grip-tab region, this cover having been made abhesive on the side facing the adhesive tape, and serving simultaneously as a grip tab for pulling. With this measure it is found, however, that the problems are not solved adequately and universally (i.e. for differently constructed products as well) and that it is necessary, moreover, to use abhesive, unwanted products.

DE 44 28 587 C2 also deals with the problem of tears in such adhesive tape strips, although in this case the tears occur at the end of the release process (cf. col. 1 lines 30–32), and as a countermeasure it proposes to give the ends of the adhesive tape strips a special shape in order for the bond area to decrease towards the end of the adhesive tape strip which disappears in the bonded joint whereas the other end can be pulled. Highly suitable examples given are pointed, zigzag and convexly curved strip ends, or else strips with a corrugated end boundary (cf. col. 1 lines 55–64). However, even adhesive tape strips of this kind continue to result in tears.

The object of the invention was to remedy this situation and, in particular, to provide adhesive tape strips of the type described with which no tears, or virtually no tears, occur on release from adhesive bonds performed with them and with which, furthermore, release is easier and more convenient than has been possible to date.

This object is achieved by an adhesive tape strip as characterized in more detail in the claims.

The key feature of the adhesive tape strip of the invention is that it is not, or not only, its end which disappears in the bonded joint that is specially shaped by means of the bond area decreasing towards the end in this region, but that the bond area in the front region of the adhesive tape strip ("front" because in the case of an adhesive bond it is this region which is located in the front part of the bonded joint, in contrast to the back region of the adhesive tape strip, which is addressed in DE 44 28 587), i.e. in the region of the grip tab, decreases towards that end of the strip which is opposite the said region. In other words, the adhesive tape strip is provided with a specially configured bond area in the grip-tab region (see e.g. FIGS. 5 to 7) and/or in the adhesive region directly bordering the grip-tab region (see e.g. FIGS. 1 to 8), in contrast to the end region of the adhesive tape strip, which is configured in accordance with DE 44 28 587.

The configuration of the invention leads not only to substantially fewer tears when the adhesive bond is released by stripping but also to a more pleasing stripping process, especially for users with little power in their hands and arms, such as women, children and the elderly. Thus, typically an adhesive strip detached by stretching in the bond plane is stripped very carefully, and hence slowly, from the bonded joint by the user in the first moments of the detachment process. If the width of the adhesive strip to be removed is constant, then the force to be applied during the subsequent detachment process remains approximately constant and the adhesive strip is removed from the bonded joint at an approximately uniform rate over the remaining length. If, however, the adhesive strip decreases in width, then the force required to remove the adhesive strip from the bonded joint becomes less. For the user, the result of the reducing stripping force and the rising stripping rate which is observed simultaneously in the course of practical use is the sensation of a very easy and pleasing removal of the adhesive strips from the bonded joint. It is in fact possible in this way to realize adhesive strips which by virtue of a sharp decrease in adhesive-strip width appear, as far as the user is concerned, to undergo stripping automatically.

One cause of the reduced tearing tendency of adhesive-strip sections which taper in the grip-tab region or on the adhesive region bordering the grip-tab region may be that in the region of an adhesive-strip taper, as a result of the reduction in the stripping force, there occurs in practice an acceleration of the stripping rate as a result of the steadily decreasing stripping force; this leads to a more uniform removal of the adhesive strips from the bonded joint and, for example, instances of sticking of the adhesive strips in the extended state, as may take place if the adhesive strips are removed slowly, do not occur. Another reason might be that the greater the adhesive-strip width of the adhesive-strip regions removed previously from the bonded joint places them under a reduced tension in the course of further stripping, and, consequently, in these regions the likelihood of tears is reduced, which brings about an overall reduction in the tendency to tear in the course of the detachment process.

Surprisingly, therefore, it is found that, with the measures specified above, simple geometric forms of an adhesive tape strip become possible, these forms allowing more convenient stripping and, moreover, a significant reduction in the tendency to tear. Such measures can be deployed for the grip-tab region in combination with those from DE 44 31 914 and/or DE 44 28 587, or else alone. Thus a marked reduction in the tearing tendency is achieved by integration of adhesive-tape regions in which the adhesive strip steadily tapers.

Adhesive tape strips of the invention can be of single- or multi-layer construction. Suitable in principle are single-layer adhesive tapes in accordance with DE 33 31 016 and DE 42 22 849 or multi-layer adhesive tapes consisting of one or more layers of adhesive and of one or more film- or foam-comprising layers in accordance with U.S. Pat. No. 4,024,312, DE 195 31 696, DE 196 26 870, DE 197 08 366, DE 196 49 727, DE 196 49 728, DE 196 49 729 or else those in accordance with WO 92/11332, WO 92/11333 and WO 95/06691.

Intermediate foam carriers may advantageously be part of adhesive tape strips of the invention when, inter alia, the intention is to use, for example, those having a relatively high flexural rigidity. In accordance with the invention it is possible to employ both single-sided and double-sided pressure-sensitive adhesive tape strips, preference being given to those which exhibit pressure-sensitive adhesion on both sides.

Adhesive tape strips of the invention are preferably below about 30 mm in width; typical adhesive strip lengths are between about 20 mm and 100 mm, preferably between about 25 mm and 75 mm and, with particular preference, between about 30 mm and 60 mm. In the end region, adhesive strips can optionally be shaped in accordance with DE 44 28 587; for example, they may run to a point. Adhesive tape strips have typical thicknesses of between about 300 $\mu$m and about 2500 $\mu$m, preferably between 400 $\mu$m and 1500 $\mu$m. Where the adhesive tape strips include one or more foam-comprising layers, typical thicknesses of adhesive film strips are from about 300 $\mu$m to about 5000 $\mu$mm, preferably from about 400 $\mu$m to about 3000 $\mu$m, and with particular preference, from about 500 $\mu$m to about 2000 $\mu$m.

Adhesive tape strips of the invention having a width which steadily reduces in one or more defined regions, and adhesive strips having a width which steadily reduces over the entire bonding region or over the entire length of the strip, have an adhesive film strip width mid-way along the strip of approximately 90% of the width of the strip at the transition between pressure-sensitive adhesive region and grip tab, preferably of approximately 75% of the width of the strip at the transition between pressure-sensitive adhesive region and grip tab.

Typical applications of adhesive film strips described above are the fixing of light to moderately heavy articles, such as pictures, calendars, posters, decorations, notices, postcards, self-adhesive mounting devices, such as self-adhesive hooks, self-adhesive picture holders, etc., in the home and office sector. In one specific embodiment, the nonadhesive grip-tab regions of such adhesive strips are produced by coloured printing or coating with coloured films, foils or papers. An advantage in this case is that, as a result of the coloured design of the grip-tab regions, the grip tabs themselves remain readily visible. A further advantage is the more attractive appearance of such adhesive strips, for children, for example. In a further specific embodiment, the adhesive strips are on average between about 2 mm and about 5 mm wide and between about 20 mm and 40 mm long in the bonding region, so making it possible to obtain adhesive strips which are particularly suitable for the adhesive bonding of very small and very light articles, such as are typically fixed to notice boards, for example.

Particular preference is given to adhesive film strip shapes which can be punched with very little loss in accordance with DE 196 41 094. Selected examples of such shapes are depicted in FIGS. 9, 10 and 11. The aforementioned examples should be understood as exemplary selections from a host of possible shapes.

Typical presentation forms include, punched adhesive tape strip sections covered on one side with a release laminate (typically release paper or release film) which are present with their second pressure-sensitive adhesive side, rather like pressure sensitive adhesive labels, on release paper roll stock or release film roll stock and can be removed, for example, from a carton pack having a slot and optionally a tear-off means, or else those which are present on release paper sheet stock or release film stock. A preferred pack form is that of a booklet which contains a plurality of sheets of release paper or release film which bear adhesive strips of the invention. Further possibilities include cartons or cans containing adhesive tape strips covered on both sides with a release paper or with a release film. The abovementioned descriptions should be understood as selected examples from a host of possible presentation forms.

FIGS. 1–11 depict exemplary embodiments; FIGS. 12 to 14 relate to the prior art.

FIG. 1 shows an embodiment in which the lateral width of the adhesive steadily decreases from the border between the grip tab and the adhesive bonding region, in the direction of the first end, to a location of the bonding region between the border and the first end; the lateral width of the adhesive then remains constant from said location to the first end.

FIG. 4 shows an embodiment in which the lateral width of the adhesive decreases at a decreasing rate from the border between the grip tab and the adhesive bonding region, in the direction of the first end, to a location of the bonding region between the border and the first end; the lateral width of the adhesive then decreases again from said location toward the first end.

FIG. 7 is similar to the embodiment of FIG. 4, except that the width of the grip tab increases from the border toward the second end.

FIG. 8 is similar to the embodiment of FIG. 4, except that the second end of the grip tab is rounded.

EXAMPLE I 40 parts of a polyisoprene-modified styrene-ethylene-butylene-styrene block copolymer (Kraton G RP 6919; Shell), 60 parts of a hydrogenated hydrocarbon resin (Regalite R 101; Hercules) and 1 part of a primary antioxidant (Irganox 1010; Ciba) are processed to a homogeneous mixture at a temperature of +180° C. in a kneading apparatus with a sigma blade. After cooling, the adhesive composition is extruded at +200° C. to produce single-layer adhesive tape sections with the thickness of 800±60 $\mu$m.

From the adhesive film sections, a punch is used to obtain rectangular adhesive strips having the dimensions 20 mm×50 mm and 10 mm×50 mm (in each case width×length) which are covered at one end on both sides with a grip tab consisting of 14 mm long and 25 $\mu$m thick polyester films (Hostaphan RN 25; Hoechst) matched to the width of the adhesive strips. Some of the 20 mm wide adhesive film sections are shaped to a point at the end in accordance with FIGS. 13 and 14. Using one adhesive strip in each case, a pair of rectangular glass plates measuring 100 mm×50 mm are bonded centrally on one of their short sides, congruently, in such a way that the nonadhesive grip-tab region projects about 12 mm from the bonded joint. The adhesive strips are subsequently removed manually from the bonded joint by stretching in the bond plane. Adhesive strips in accordance with FIG. 1 (grip tab: 20 mm wide, 12 mm long, lined on both sides with 25 $\mu$m thick polyester film; pressure-sensitive adhesive region: 38 mm long, tapering of the adhesive strip width directly following the nonadhesive grip-tab region over a length of 5 mm to a constant end width of 10 mm); in accordance with FIG. 3 (grip tab: 20 mm wide, 12 mm long, covered on both sides with 25 $\mu$m thick polyester film; pressure-sensitive adhesive region: 38 mm long, tapering of the adhesive strip width directly following the nonadhesive grip tab region to an end width of 0 mm); and in accordance with FIG. 4 (grip tab: 20 mm wide, 12 mm long, covered on both sides with 25 $\mu$m thick polyester film; pressure-sensitive adhesive region 12 mm wide in the middle) are each tested 10 times. The results obtained are as follows:

| Test | Adhesive strip width | Adhesive strip shape | Number of tears in the grip-tab region |
|---|---|---|---|
| 1-01 | 20 mm | as FIG. 12 | 6 out of 10 |
| 1-02 | 20 mm | as FIG. 13 | 5 out of 10 |
| 1-03 | 20 mm | as FIG. 14 | 7 out of 10 |
| 1-01a | 10 mm | as FIG. 12 | 5 out of 10 |

Figure 1:
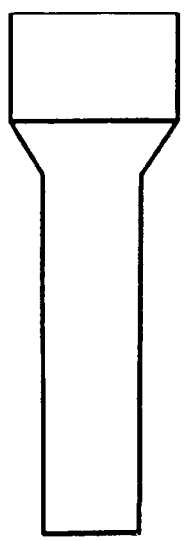
Figure 3:
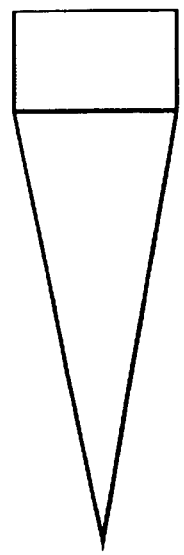
Figure 4:
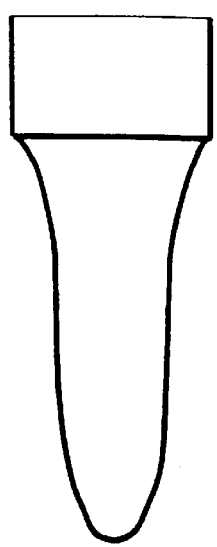
Figure 5:
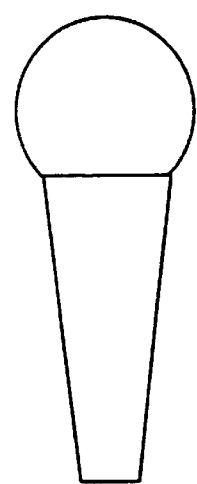

| Test | Adhesive strip shape | Number of tears in the grip-tab region |
|---|---|---|
| 1-04 | as FIG. 1; for dimensions see text | 1 |
| 1-05 | as FIG. 3; for dimensions see text | 0 |
| 1-06 | as FIG. 4; for dimensions see text | 0 |

The shaping at the end of the adhesive strip has no effect on the tearing tendency in the grip-tab region. In the width range between 10 mm and 20 mm, no significant reduction is evident in the tearing tendency with adhesive-strip shapes in accordance with FIG. 12. The tapering in the bond region directly following the grip-tab region achieves a significant reduction in the number, or complete elimination, of tears.

EXAMPLE II

From adhesive film sections in accordance with Example I, adhesive strips having the dimensions 50 mm×20 mm (length×maximum width) with a steadily tapering strip width, as in FIGS. 2, 3, 4 and 6, are punched out and are investigated in comparison to the shape shown in FIGS. 12 and 13. Testing is in accordance with Example I. In addition, the detachment process is assessed qualitatively.

Figure 2:
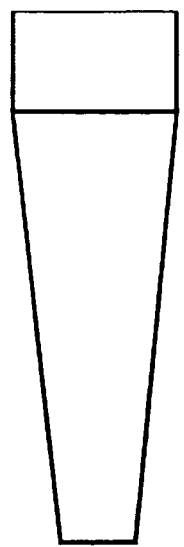
Figure 6:
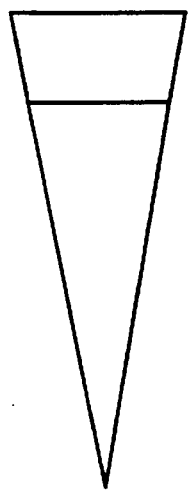
Figure 7:
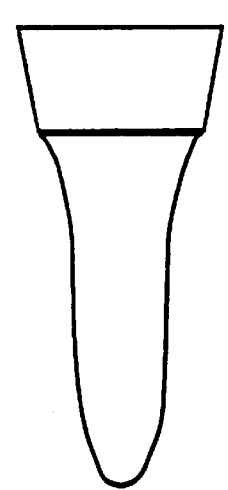

| Test | Adhesive strip shape as in | Tears | Qualitative assessment of the detachment behaviour |
|---|---|---|---|
| 2-01 | FIG. 12 | 6 out of 10 | difficult |
| 2-02 | FIG. 13 | 7 out of 10 | difficult until the taper |
| 2-03 | FIG. 2 | 2 out of 10 | more pleasing than test 2-01 |
| 2-04 | FIG. 3 | 1 out of 10 | very pleasing |
| 2-05 | FIG. 4 | 0 out of 10 | very pleasing |
| 2-06 | FIG. 6 | 0 out of 10 | very pleasing |

The steadily tapering adhesive film strip width significantly reduces the tearing tendency or even eliminates it completely. In the qualitative assessment of the detachment behaviour, adhesive strips having a steadily tapering width are perceived as very pleasing.

Figure 8:
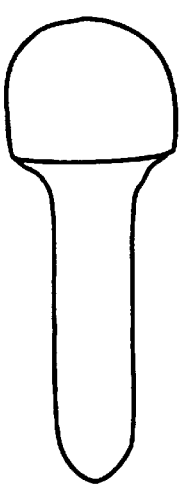

EXAMPLE III 40 parts of Kraton G RP 6909, 10 parts of Kraton G 1650 (styrene-isoprene-styrene triblock polymer; Shell), 50 parts of Regalite R 101 and 1 part of Irganox 1010 are processed as in Example I to a homogeneous pressure-sensitive adhesive composition which is then used to manufacture adhesive tapes of 750±50 µm. From the resulting adhesive tape sections, adhesive strips as in FIGS. 1, 2, 4, 6 and 12 are produced by punching in accordance with Example I. All adhesive strips have a total length of 45 mm, the grip tabs a length of 14 mm. In addition, adhesive strips as in FIG. 8 (test 4–11) are produced. The latter have a grip-tab length and width of 7 mm. The total length is 35 mm. Test samples were prepared and assessed as in Example I. The results obtained are as follows:

| Test | Adhesive strip shape as in | Adhesive strip width at strip mid-point** | Number of tears |
|---|---|---|---|
| 3-01 | FIG. 1 | 8 mm | 0 out of 10 |
| 3-02 | FIG. 2 | 10 mm | 0 out of 10 |
| 3-03 | FIG. 4 | 9 mm | 0 out of 10 |
| 3-04 | FIG. 6 | 7.5 mm | 0 out of 10 |
| 3-05 | FIG. 12 | 15 mm | 3 out of 10* |
| 3-11 | FIG. 8 | 3.5 mm | 0 out of 10 |

*1 tear in the grip-tab region, 2 tears at the end of the adhesive strip
**FIGS. 1, 2, 4, 8: width in the middle of the adhesive area; FIG. 6: width in the middle of the adhesive strip 1 tear in the grip-tab region, 2 tears at the end of the adhesive strip FIGS. 1, 2, 4, 8: width in the middle of the adhesive area; FIG. 6: width in the middle of the adhesive strip

| Test | Qualitative assessment of the detachment behaviour |
|---|---|
| 3-01 | pleasing to very pleasing |
| 3-02 | pleasing to very pleasing |
| 3-03 | very pleasing |
| 3-04 | very pleasing |
| 3-05 | less pleasing than test 3-01, 3-02 and 3-05 |
| 3-11 | very pleasing |

All of the adhesive strips which taper in the bonding region following the grip-tab region can be detached without tears. The detachment behaviour of tests 3-01 to 3-04, with tapering adhesive tapes, was assessed, in contradistinction to test 3-06, as pleasing to very pleasing, or as very pleasing.

EXAMPLE IV

In adhesive strips as in test 3-11, the polyester film grip tabs are replaced by circular coloured paper grip tabs with a diameter of 7 mm. Corresponding adhesive strips are particularly suitable for the adhesive bonding of small and very light, flat articles to notice boards, for example. By virtue of the coloured configuration of the grip-tab regions, their position can be recognized very rapidly and hence easily found again. Particularly suitable for rapid recognition are grip-tab regions printed with fluorescent inks.

What is claimed is:

1. An adhesive tape strip for bonding adhesively to a surface along a bond plane, which tape can be removed from the surface by pulling in the direction of the bond plane, the tape strip having upper and lower planar surfaces, a first longitudinal end and a second, opposite longitudinal end, the second end being in the form of a grip tab extending from the second end to a border with an adhesive bonding region of the strip, the lower planar surface of the strip bearing a pressure-sensitive adhesive, the adhesive bonding region extending from the first end to the border, wherein a lateral width of the adhesive increases from the border in the direction of the second end to at least a location of the grip tab between the border and the second end and/or decreases from the border in the direction of the first end to at least a location of the adhesive bonding region between the border and the first end.

2. The adhesive tape strip according to claim 1, wherein the width of the adhesive at a longitudinal mid-way point between the border and the first end is less than 90% of the width at the border.

3. The adhesive tape strip according to claim 2, wherein the width of the adhesive at a longitudinal mid-way point between the border and the first end is less than 75% of the width at the border.

4. The adhesive tape strip according to claim 1, wherein the width of the adhesive increases from the first end in a direction toward the second end.

5. The adhesive tape strip according to claim 1, wherein the width of the adhesive decreases continuously from the border to the first end.

6. The adhesive tape strip according to claim 4, wherein a longitudinal intermediate region of the adhesive bonding region is defined between a first intermediate point located between the border and the first end, and a second intermediate point located between the first intermediate point and the border; and wherein the width of the adhesive decreases from the border towards the second intermediate point, and from the first intermediate point towards the first end.

7. The adhesive tape strip according to claim 6, wherein a width of the adhesive along the intermediate region is of a constant width in a longitudinal direction.

8. The adhesive tape strip according to claim 6, wherein the width of the adhesive in the intermediate region decreases in a direction from the second intermediate point towards the first intermediate point, but a degree of decrease in width of the adhesive in the intermediate region is less than a degree of decrease in width from the border towards the second intermediate point and less than a degree of decrease in width from the first intermediate point towards the first end.

9. The adhesive tape strip according to claim 4, wherein the first end is in a form chosen from the group consisting of a point, a zigzag, a convex curvature and corrugation.

10. The adhesive tape strip according to claim 4, wherein the width of the adhesive applied to the strip in the adhesive region is independent from the width of the of the strip itself in the adhesive region, so that an increase in the width of the adhesive from the first end toward the border does not necessarily require a change in width of the strip in the adhesive bonding region, the strip being non-adhesive in those portions thereof where the adhesive has a width less than the width of the strip.

11. The adhesive tape strip according to claim 1, wherein the grip tab is non-adhesive at least on the lower surface thereof.

12. The adhesive tape strip according to claim 1, wherein the grip tab is rendered non-adhesive by applying a cover to at least the lower surface thereof.

13. The adhesive tape strip according to claim 2, wherein the cover is UV-impermeable.

14. The adhesive tape strip according to claim 2, wherein the cover comprises a dimensionally stable polymer film.

15. The adhesive tape strip according to claim 2, wherein the cover is applied to the upper and lower surface of the grip tab.

16. The adhesive tape strip according to claim 1, wherein the strip comprises one or more foam-containing layers.

17. The adhesive tape strip according to claim 1, wherein the tape strip comprises a composition of thermoplastic rubber and tackifying resins, the tape strip having high elasticity and low plasticity, and wherein its adhesion is less than its cohesion, a ratio of peel force to tensile strength being at least 1:1.5, and wherein it is self-adhesive or heat-activatable.

18. The adhesive tape strip according to claim 1, wherein the tape strip comprises a highly extensible, virtually non-resilient backing film having a front side and rear side, and a pressure-sensitive adhesive composition on both front and rear sides of the backing film, the backing film having a sufficiently high tensile strength at break such that it does not tear before the tape strip has been peeled from a substrate to which it has been applied.

* * * * *